United States Patent
Faulhaber et al.

[19]

[11] Patent Number: 6,158,891
[45] Date of Patent: Dec. 12, 2000

[54] TRAVELLER ASSEMBLY FOR A LINEAR GUIDING DEVICE

[75] Inventors: Thomas Faulhaber, Bergrheinfeld; Matthias Howorka, Waigolshausen, both of Germany

[73] Assignee: Deutsche Star GmbH, Schweinfurt, Germany

[21] Appl. No.: 09/080,693

[22] Filed: May 18, 1998

[30] Foreign Application Priority Data

May 27, 1997 [DD] German Dem. Rep. .......... 197 22 171

[51] Int. Cl.⁷ .................................................. F16C 29/06
[52] U.S. Cl. ................................................. 384/45
[58] Field of Search ................................. 384/45, 43, 44; 464/168

[56] References Cited

U.S. PATENT DOCUMENTS

| | | |
|---|---|---|
| 2,992,620 | 7/1961 | Cherkas . |
| 3,998,497 | 12/1976 | Koizumi . |
| 5,018,306 | 5/1991 | Prevot . |
| 5,044,779 | 9/1991 | Albert et al. . |
| 5,474,384 | 12/1995 | Ludwig et al. . |

FOREIGN PATENT DOCUMENTS

| | | |
|---|---|---|
| 0353390 | 2/1990 | European Pat. Off. . |
| 0 378 879 | 7/1990 | European Pat. Off. . |
| 0 517 951 | 12/1992 | European Pat. Off. . |
| 0 561 529 | 9/1993 | European Pat. Off. . |
| 0517951 | 11/1995 | European Pat. Off. . |
| 7631466 | 5/1978 | France . |
| 2530907 | 1/1976 | Germany . |
| 8601143 | 4/1986 | Germany . |
| 3638968 | 5/1988 | Germany . |
| 3809176 | 10/1988 | Germany . |
| 3810205 | 11/1988 | Germany . |
| 3829276 | 3/1990 | Germany . |
| 3910457 | 10/1990 | Germany . |
| 9011073 | 11/1990 | Germany . |
| 9013522 | 1/1991 | Germany . |
| 9206715 | 9/1992 | Germany . |
| 9308306 | 9/1993 | Germany . |
| 9407424 | 10/1995 | Germany . |
| 63-168322 | 11/1988 | Japan . |
| 1090084 | 11/1967 | United Kingdom . |
| 2223066 | 8/1992 | United Kingdom . |

OTHER PUBLICATIONS

Brochure, Rose + Krieger Verbindungs–und Positioniersysteme, BLOCAN Profil–Montagesystem, Oct. 1988.

Cover and p. 43 of Book: FB550 k1 Vogel Fachbuch Konstruktion, Krahn/Nörthemann/Stenger Konstruktions–elemente für Vorrichtungs– und Maschinenbau. (No Date).

*Primary Examiner*—Lenard A. Footland
*Attorney, Agent, or Firm*—Baker Botts, L.L.P.

[57] ABSTRACT

A traveller assembly for a linear guiding device includes a basic body supported on a guide rail assembly by at least one guide member unit, which is affixed to the basic body by a support member, the position of which along the basic body is adjustable. The guide member unit is adjustable relative to the basic body and the support member along a plane of advancement parallel to the guide axis of the guide rail assembly and in a direction perpendicular to the guide axis by an adjusting element that acts between the guide member unit and the support member.

21 Claims, 6 Drawing Sheets

TRAVELLER ASSEMBLY FOR A LINEAR GUIDING DEVICE

FIELD OF THE INVENTION

The present invention relates to a traveller assembly for a linear guiding device, the traveller assembly being guided on a guide rail assembly along a guide axis, wherein at least one guide member of the traveller assembly cooperating with a raceway of the guide rail assembly is adjustable within the traveller assembly in a plane of advancement parallel to the guide axis in a direction of advancement substantially perpendicular with respect to the guide axis and therefore is adjustable for adjusting the guiding clearance with respect to the raceway, the traveller assembly comprising a basic body and at least one guide member unit, the guide member unit being supported on at least one support member by means of a support element, the support member being connected to the basic body, and extending substantially perpendicular with respect to the plane of advancement, and crossing the guide member unit, the support element being adjustably supported substantially in the direction of advancement on the guide member unit.

BACKGROUND OF THE INVENTION

From EP 0 517 951 B1 there is known a traveller assembly in which a guide member unit can be attached to a basic body by means of a plurality of fastening screws. The fastening screws traverse the guide member unit and are screwed into respective threaded holes in the basic body with a threaded portion thereof. Within the guide member unit associated to at least one of the fastening screws there is provided an advancing mechanism by means of which the guide member unit is supported on the respective fastening screw and is movable towards a raceway under the generation of an advancing force. With such a traveller assembly there exists a problem that after once having determined a position of the threaded openings for the fastening screws and having provided the threaded openings at these positions the guide member unit can only be displaced with respect to the basic body for providing the advancing movement; the guide member unit is fixed to the basic body in a defined position against other movements.

SUMMARY OF THE INVENTION

It is an object of the present invention to provide a traveller assembly for a linear guiding device which allows an easy adaptation thereof to different constructional configurations of working systems.

According to the present invention this object is solved by a traveller assembly for a linear guiding device, the traveller assembly being guided on a guide rail assembly along a guide axis, wherein at least one guide member of the traveller assembly cooperating with a raceway of the guide rail assembly is adjustable in a plane of advancement parallel to the guide axis in a direction of advancement substantially perpendicular with respect to the guide axis within the traveller assembly and therefore is adjustable for adjusting the guiding clearance with respect to the raceway, the traveller assembly comprising a basic body and at least one guide member unit, the guide member unit being supported on at least one support member by means of a support element, the support member being connected to the basic body, and extending substantially perpendicular with respect to the plane of advancement, and crossing the guide member unit, the support element being adjustably supported substantially in the direction of advancement on the guide member unit.

With the inventive traveller assembly it is further provided that the support member is positionally adjustable on the basic body in at least one positioning direction, which positioning direction is transverse to the extension of the support member.

Therefore, in the traveller assembly according to the invention the position of the support member on the basic body can be selected, i.e. the position of a guide member unit cooperating with the support member can also be selected with respect to the basic body. This provides for the possibility of assembling the components—basic body and guide member unit—in adaptation to different use requirements such that a very flexible and manifoldly usable system can be obtained.

Advantageously, a positioning track extending along the at least one positioning direction is arranged on the basic body, and a positioning track engagement element is attached to the support member, the positioning track engagement element being fixable at a plurality of positioning locations on the basic body, the positioning locations being distributed along the positioning track. With such a configuration it is provided that due to the fixation of the positioning track engagement element and therefore of the support member in the respective positioning track the respective guide member unit may be supported on the support member for advancing the guide member unit against a guiding raceway, without the danger that the support member displaces within the positioning groove or tilts or moves in an inappropriate kind.

In order to maximize the number of possible relative positioning positions, it is proposed that the positioning track engagement element is continuously adjustable along the positioning track and fixable at arbitrary positioning locations.

In order to provide a secure cooperation between the positioning track and the guide member unit allowing an easy positional adjustment it is proposed that the positioning track is provided by an undercut positioning groove in an abutment face of the basic body, against which the guide member unit lies with a counter abutment face thereof. For example the positioning groove may be provided by a T-groove or a dove-tailed groove.

An easily obtainable and easily releasable fixation of the guide member unit on the basic body can be obtained, if the positioning track engagement element is fixable within the positioning track by means of clamping means.

In this case the design can be such that, if the positioning track is provided as an undercut positioning groove and the positioning track engagement member is arranged within the undercut positioning groove, the clamping means comprises at least one bottom clamping member and at least one undercut clamping face, the undercut clamping face engaging an undercut face of the undercut positioning groove from the rear, the bottom clamping member being adjustable with respect to the positioning track engagement element and acting onto the bottom of the undercut positioning groove.

If in this case the at least one bottom clamping member is adjustable within the positioning track engagement element by screwing a secure clamping action can be obtained and the clamping engagement can easily be obtained and released.

In order to keep the number of components of the traveller assembly according to the present invention as small as possible it is proposed that at least one bottom clamping member is provided by the end portion of a support member.

In order to be able to obtain and release the clamping action, it is proposed that the support member has at an end portion thereof remote from the positioning track a turning tool engagement face for approaching an end portion thereof proximate to the positioning groove to the bottom of the undercut positioning groove, and has a tightening member engagement means for the engagement of a tightening member pressing the guide member unit against the basic body.

An easy but secure fixation of the guide member unit can be obtained if the tightening member engagement means is provided by an external thread of the support member and the tightening member is provided by a tightening nut.

According to a further embodiment of the present invention, the positioning groove engagement element may have at least one threaded hole for receiving a bottom clamping member separated from the support member, and may have at least one further threaded hole for receiving an external thread of the support member, wherein a tightening face is provided on the support member in a portion thereof remote from the positioning track for pressing that guide member unit against the basic body.

According to a further alternative embodiment the support member may be fixable to the basic body by tightening the guide member unit against the basic body by means of the support member by introducing a tightening force into the support member, which force on the one hand is sufficient for the fixation and on the other hand allows the adjustment of the guide member unit in the direction of advancement.

In order to allow such a fixation of the support member to the basic body it is proposed that the frictional conditions between the support member and the basic body on the one hand and the frictional conditions between the guide member unit and the basic body on the other hand are differently selected such that upon introducing a predetermined tension into the support member the support member is fixed with respect to the basic body and the guide member unit is still adjustable in the direction of advancement.

This can be obtained if frictional force enhancement profile means are provided between the support member on the one hand and the basic body on the other hand.

Preferably, the positioning track engagement element is arranged for a fixation of two guide member units opposing each other transversely with respect to the guide axis, wherein the guide member units are associated to respective raceways of the guide rail assembly.

In order to enhance the freedom upon selecting the relative positioning between the guide member unit and the basic body, it is proposed that on at least one abutment face of the basic body a plurality of parallel positioning tracks are arranged side by side. Further, it is possible that at least one respective positioning track is provided on each of at least two abutment faces of the basic body, the positioning tracks extending substantially parallel to each other in the abutment faces. With such a design of the basic body flexible working stations working in a plurality of movement coordinate directions may be obtained.

Such a configuration of the basic body is in particular advantageous if the basic body is provided as an extrusion profile, in which at least one positioning track is formed as an undercut positioning groove during the extrusion procedure.

At least two groups of guide member units may be attached to the basic body, the groups being provided for the cooperation with different guide rail assemblies. As already mentioned, in this case working stations, moving robots or the same working in at least two movement coordinate directions can be realized.

In order to provide a most effective movement in different coordinate directions it is proposed that the groups of guide member units are arranged for the cooperation with two guide rail assemblies crossing each other.

For providing an appropriate advancing force for a respective guide member unit against the raceway, it is proposed that the support element is adjustable on the guide member unit by means of an adjustment drive.

The present invention is further described with respect to the accompanying drawings by means of the preferred embodiments.

BRIEF DESCRIPTION OF THE DRAWINGS

FIGS. 8a and 8b are views of a hammerhead bolt shown in FIG. 7 wherein FIG. 8a is a view in a direction VIIIa in FIG. 8b.

DESCRIPTION OF THE PREFERRED EMBODIMENTS

Figure 1:
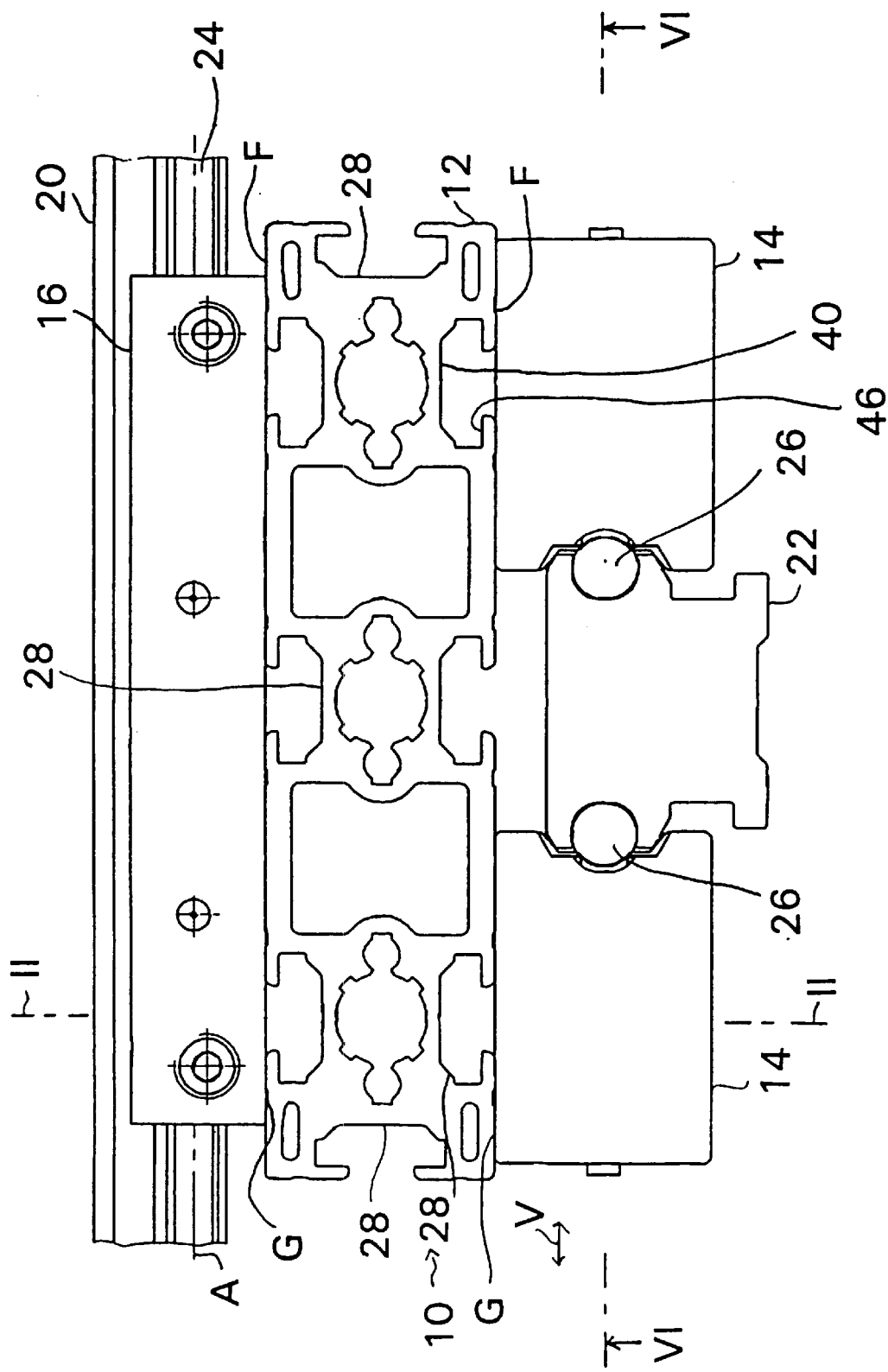
FIG. 1 is a schematic side view of a traveller assembly according to the present invention wherein the traveller assembly cooperates with two raceways extending substantially perpendicular with respect to each other.

FIG. 1 shows a schematic side view of a traveller assembly 10. The traveller assembly 10 comprises a basic body 12 and a first group of guide member units comprising guide member units 14 and a second group of guide member units comprising guide member units 16; in FIG. 1 only the guide member unit 16 lying in front of a guiding raceway or track 20 can be seen. The guide member units 14, 16 lie against a respective abutment face F of the basic body 12 with respective counterfaces G. A further guiding raceway 22 is arranged between the guide member units 14 of the first group and extends substantially perpendicular with respect to the guiding raceway 20. In accordance with the extension of the respective guiding raceways 20, 22 the guide member units 14 and 16, respectively, are arranged on the basic body 12 such, that they extend in a respective longitudinal direction of the corresponding guiding raceway 20 and 22, respectively. I.e. also the respective guide member units 14 and 16, respectively, of the different groups are arranged on the basic body 12 substantially perpendicular with respect to each other. The guide member units 14 and 16, respectively, lie against the guiding raceways 20, 22 via guiding members, for example guiding rollers, as discussed later, and via guiding wires 24 and 26, respectively, provided on the respective guiding raceways.

As can be seen in FIG. 1, a plurality of positioning tracks in the form of profile grooves 28 are provided on the basic body 12 and, as discussed later, in the region of these profile grooves 28, the respective guide member units 14, 16 can be attached to the basic body 12 in a positionally variable manner.

Figure 2:
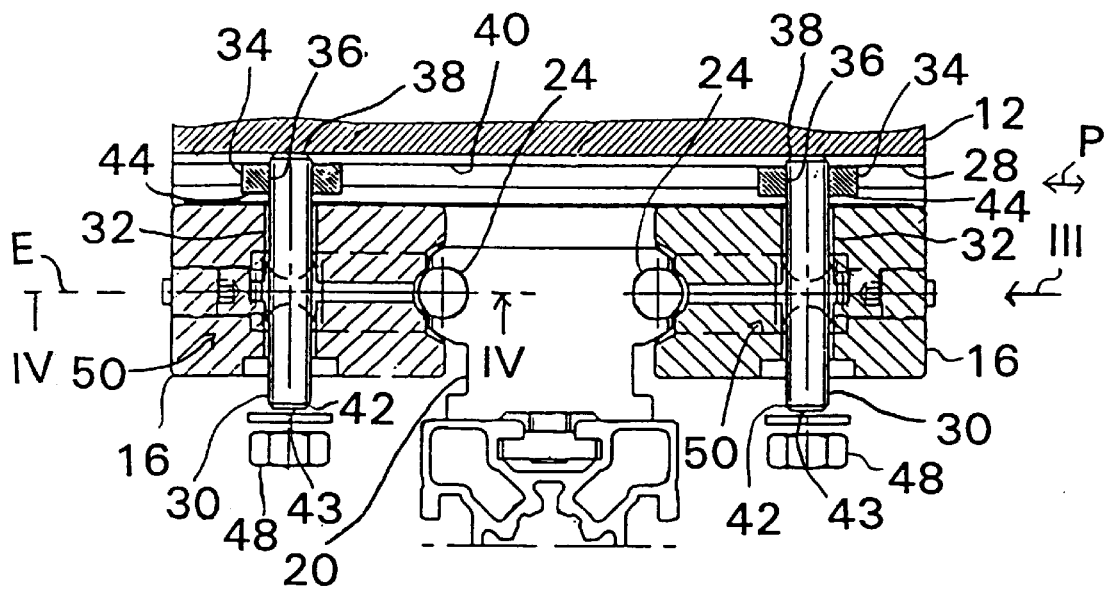
FIG. 2 is a sectional part view along a line II—II in FIG. 1.
Figure 3:
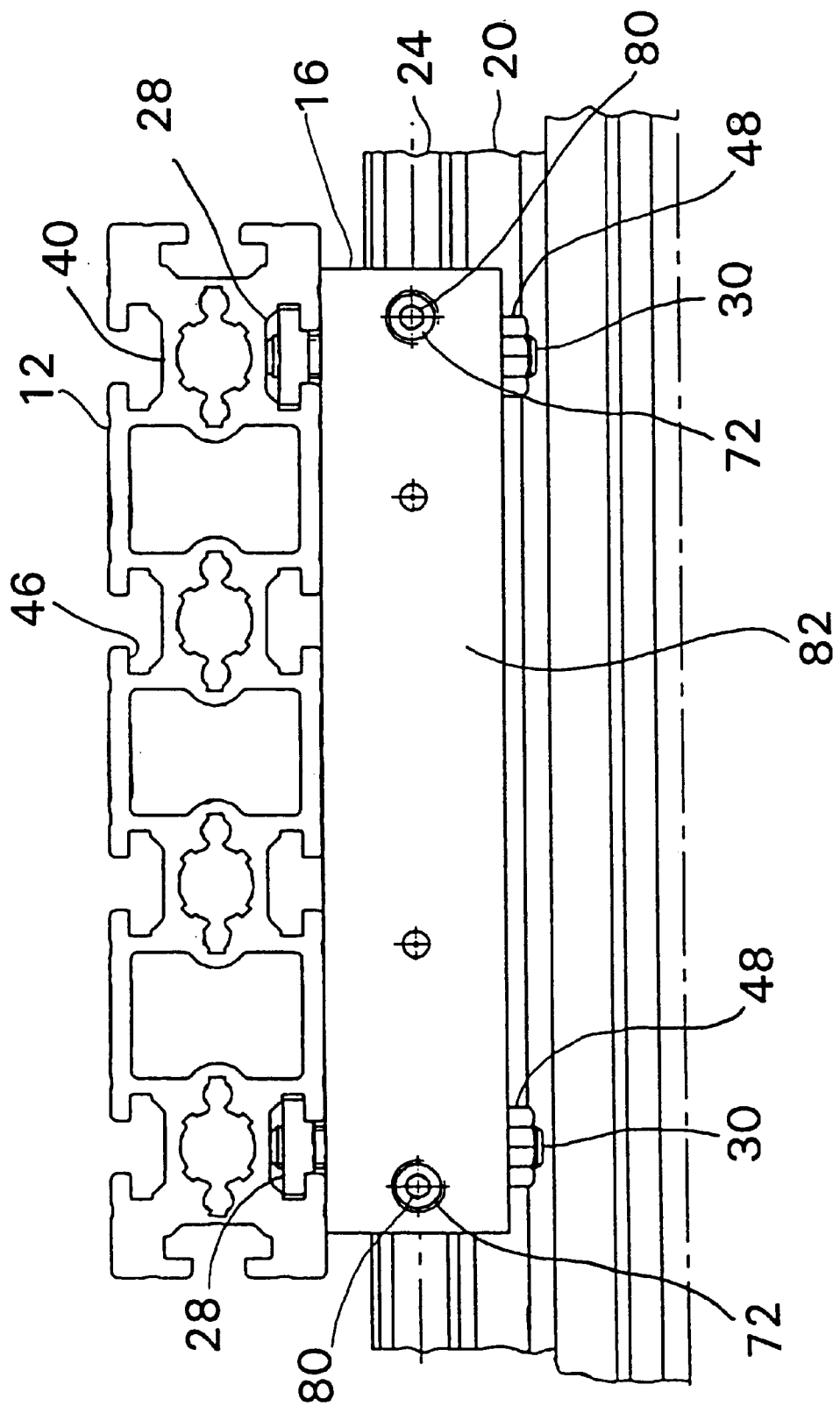
FIG. 3 is a side view of the traveller assembly shown in FIG. 2 in a direction of an arrow III in FIG. 2.

With respect to FIGS. 2 and 3, it can be seen that the respective guide member units 16 are fixed to the basic body 12 by means of support members, such as fastening bolts 30. The fastening bolts 30 are threaded bolts having external threads, i.e. at least in both end portions thereof they are provided with external threaded portions, and they penetrate respective passage openings 32 in the guide member units 16. In the respectives grooves 28, groove blocks 34 are received. The groove blocks 34 serve as positioning track engagement elements and have such a cross-sectional profile that they can be displaced in the substantially T-shaped grooves 28 in a positioning direction P, but cannot be turned within the grooves and cannot drop off the grooves. Each of the groove blocks 34 has an internal threaded opening 36 into which the fastening bolts 30 can be screwed with their external threads.

For fixing a guide member unit 16 to the basic body 12, the following measures are taken: at first the respective groove blocks are positioned approximately in the desired position on the basic body 12, i.e. the associated groove 28. Thereupon a fastening bolt 30 is screwed into each of the groove blocks but only so far that it does not abut the groove bottom 40 with its end portion 38. For screwing the fastening bolts 30 into the groove blocks 34 at the other ends 42 thereof a tool engagement arrangement 43, for example in the shape of a hexagon opening 43 or the like, is provided.

As in such a position the fastening screws 30 do not abut against the groove bottom 40 with their ends 38 the groove blocks 34 can still be displaced together with the fastening bolts 30 within the grooves 28. If a desired coarse positioning or fine positioning has been carried out, the guide member units 16 are pushed over the fastening bolts 30 with their passage openings 32. In FIG. 2 this for example can be done with simultaneously arranging the guiding raceway 20 with the guiding wires 24 between the guide member units 16. Next the fastening bolts 30 are further screwed into the groove blocks 34 by means of a tool until the ends 38 thereof press against the groove bottom 40, such that in a corresponding manner the groove blocks 34 are displaced from the groove bottom 40 and press against faces or undercut faces 46 (see FIG. 1) of the groove 28 with respective clamping faces or undercut clamping faces 44. If the fastening bolts 30 are tightened fixedly, due to the generated clamping action a secure fixation of the fastening bolts 30 to the basic body 12 is obtained. After or before such a fixing of the fastening bolts 30 nuts 48 can be screwed to the fastening bolts 30 in the region of the ends 42 thereof, but only so far that only an unintended dropping of the guide member units 16 off the fastening bolts 30 is prevented but the guide member units 16 still are not finally fixed to the basic body 12.

As can be seen in FIG. 2 advancement devices generally indicated by 50 are associated to the respective fastening bolts 30, by means of which advancement devices the guide member units 16 can be advanced against the guiding raceway 20, i.e. the guiding wires 24 thereof, with the support of the fastening bolts 30, in order to set a desired clearance of motion. The basic construction and the function of such advancement devices is described in the following with reference to FIG. 6.

Figure 6:
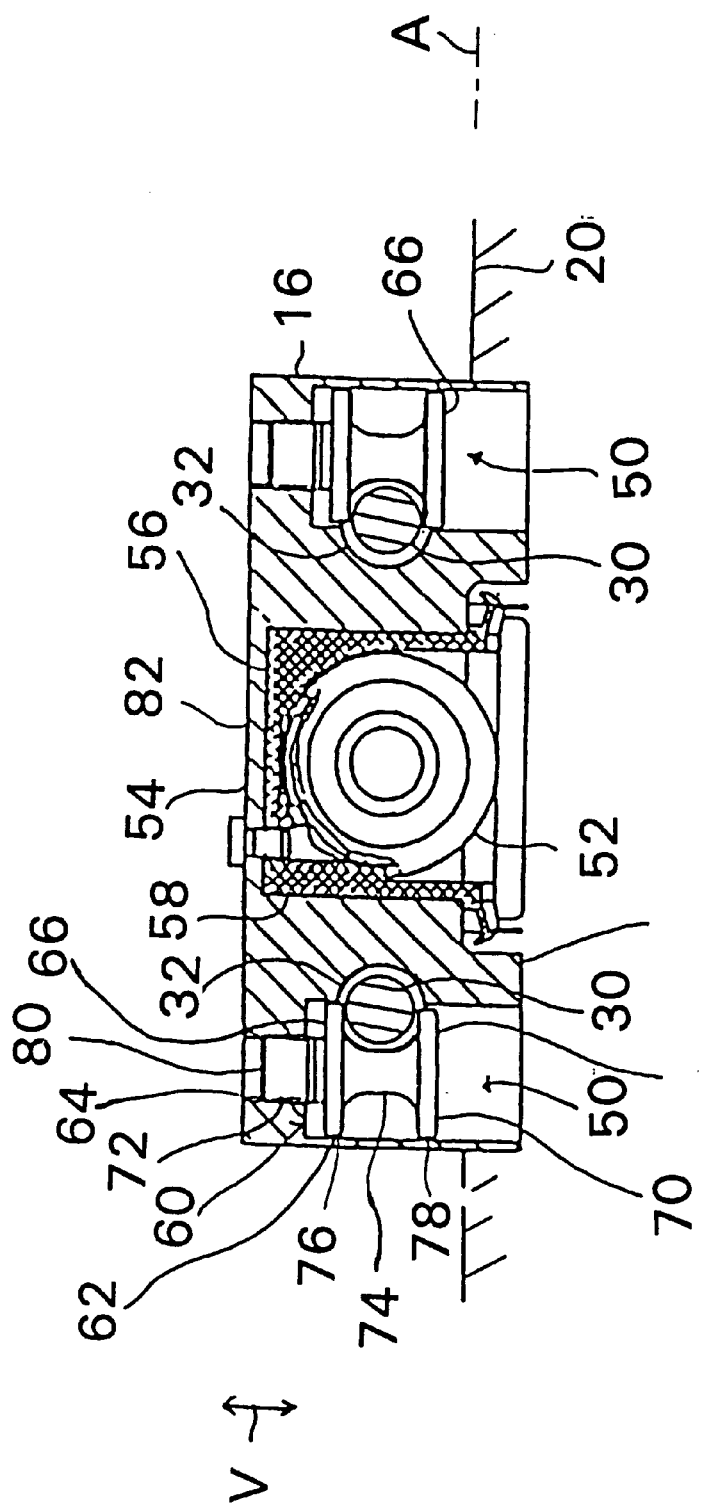
FIG. 6 is an explaining sectional view along a line VI—VI in FIG. 1, showing a possible embodiment of an advance device for a guide member unit.

In FIG. 6 a sectional view of the guide member unit 16 having a guiding roller 52 is shown, which guiding roller is arranged between two passage openings 32. The guide member unit 16 comprises a body 54 having a recess 56, and a lining 58 turnably receiving a guiding roller 52 therein is accommodated in the recess 56. The lining 58 constitutes a lubricant pocket for the guiding roller 52, such that the guiding roller 52 can be moved along the guiding raceway 20 in a lubricated manner. At both axial ends of the body 54 passage openings 60 extending substantially perpendicular to the guiding raceway 20 are arranged, which openings in a portion 62 proximate to the guiding raceway 20 have a bigger cross-section and in a portion 64 remote from the guiding raceway 20 and coaxial to the portion 62 have a smaller cross-section. The portion 64 having the smaller diameter is an internal threaded portion. In each of the passage openings 60 an adjustment element 66 is arranged, comprising a spool-like first portion 70 having a bigger diameter and being fixedly connected or integrally provided with an external threaded portion 72 having a smaller diameter. The portion 72 having the smaller diameter is an external threaded portion screwed into the portion 64 of the passage opening 60. The passage opening 32 for the fastening bolt 30 and the passage opening 60 are substantially perpendicular with respect to each other and are arranged such that they partly overlap. This leads to a partial engagement of the fastening bolt 30 into the circumferential groove 74 of the portion 72 of the adjustment element 66, such that the fastening bolt 30 is engaged by the circumferential flange portions 76, 78 on both sides in an direction of advancement V, as can be seen in FIG. 6.

The passage opening 60 is open to the backside 82 of the body 56 remote from the guiding raceway 20 in its portion 64, such that a tool can be introduced into a tool engagement arrangement 80 provided on the portion 72 of the adjustment element 66, for example a hexagonal opening. By turning the tool and thereby turning the adjustment element 66 the adjustment element 66 is displaced in the direction of the direction of advancement V. Since the circumferential flanges 76, 78 engage both sides of the fastening bolt 30 the fastening bolt 30 received in the passage opening 32 with a clearance of motion in the direction of advancement V is displaced with respect to the body 54 in the direction of advancement V of such a displacement of the adjustment element 66. However, since the fastening bolt 30 is fixed to the basic body, such a relative displacement between the fastening bolt 30 and the body 54 of the guide member unit 16 leads to a movement of the body 54 in a plane of advancement E constituted by the drawing plane in FIG. 6 (see FIG. 2). By appropriately operating the both adjustment elements 66 within the body 54, a desired advancement of the guide member unit 16 against the guiding raceway 20 and therefore the desired adjustment of the clearance can be carried out.

Since the direction of advancement V is substantially perpendicular with respect to the guide axis A of the guiding raceway 20 the advancement is carried out with maximum efficiency.

In order to allow the above advancement of the guide member units 14 and 16, respectively, towards the respective guiding raceways 20 and 22, respectively, with the use of the supporting action of the fastening bolts 30, as already discussed, the fastening bolts 30 are secured in the respective grooves 28 against displacement in the positioning direction P. This is of particular importance for the guide member units 16 shown in the upper part of FIG. 1 since for these guide member units 16 the direction of advancement V, which is perpendicular with respect to the drawing plane in FIG. 1 and therefore to the guiding axis A, extends parallel to the grooves 28 which also are orthogonal with respect to the drawing plane in FIG. 1. If the fastening bolts were not secured against displacement within the grooves 28 as discussed above the advancement of the guide member units 16 due to the supporting function of the fastening bolts 30 would lead to a displacement of the fastening bolts 30 within the grooves 28.

Also with the guide member units 14 shown in the lower part of FIG. 1, for which the guiding grooves 28 extend perpendicular with respect to the direction of advancement V provided for the guide member units, the fixing of the fastening bolts within the guiding grooves 28 is advantageous since even in this case a lateral tilting of the fastening bolts 30 can be avoided, which might occur because the groove blocks 34 have a clearance of motion.

After the respective adjustment elements 66 have been operated for generating the desired advancement and therefore the guide member units 14 and 16, respectively, have been positioned in their desired relative position with respect to the guiding raceways 20, 22, the nuts 48 can be tightened and the guide member units 14 and 16, respectively, can be finally fixed to the basic body 12. After that a correction of the position can be carried out by loosening the nuts 48, i.e. loosening the clamping engagement of the fastening bolts 30 at the groove bottom 40.

Figure 4:
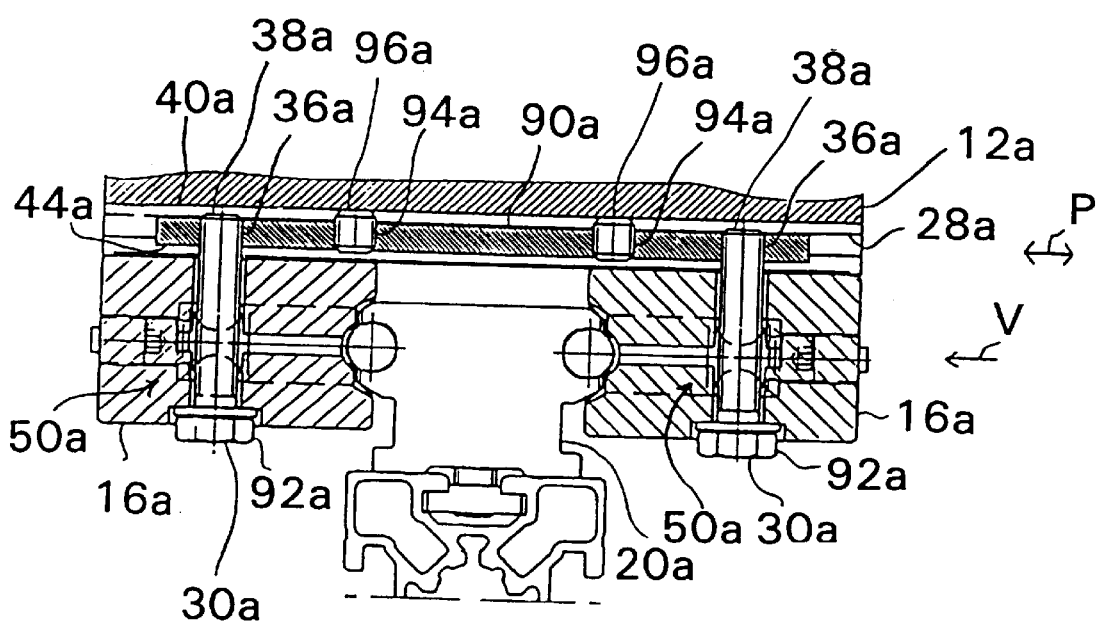
FIG. 4 is view corresponding to FIG. 2 of an alternative embodiment of the traveller assembly.
Figure 5:
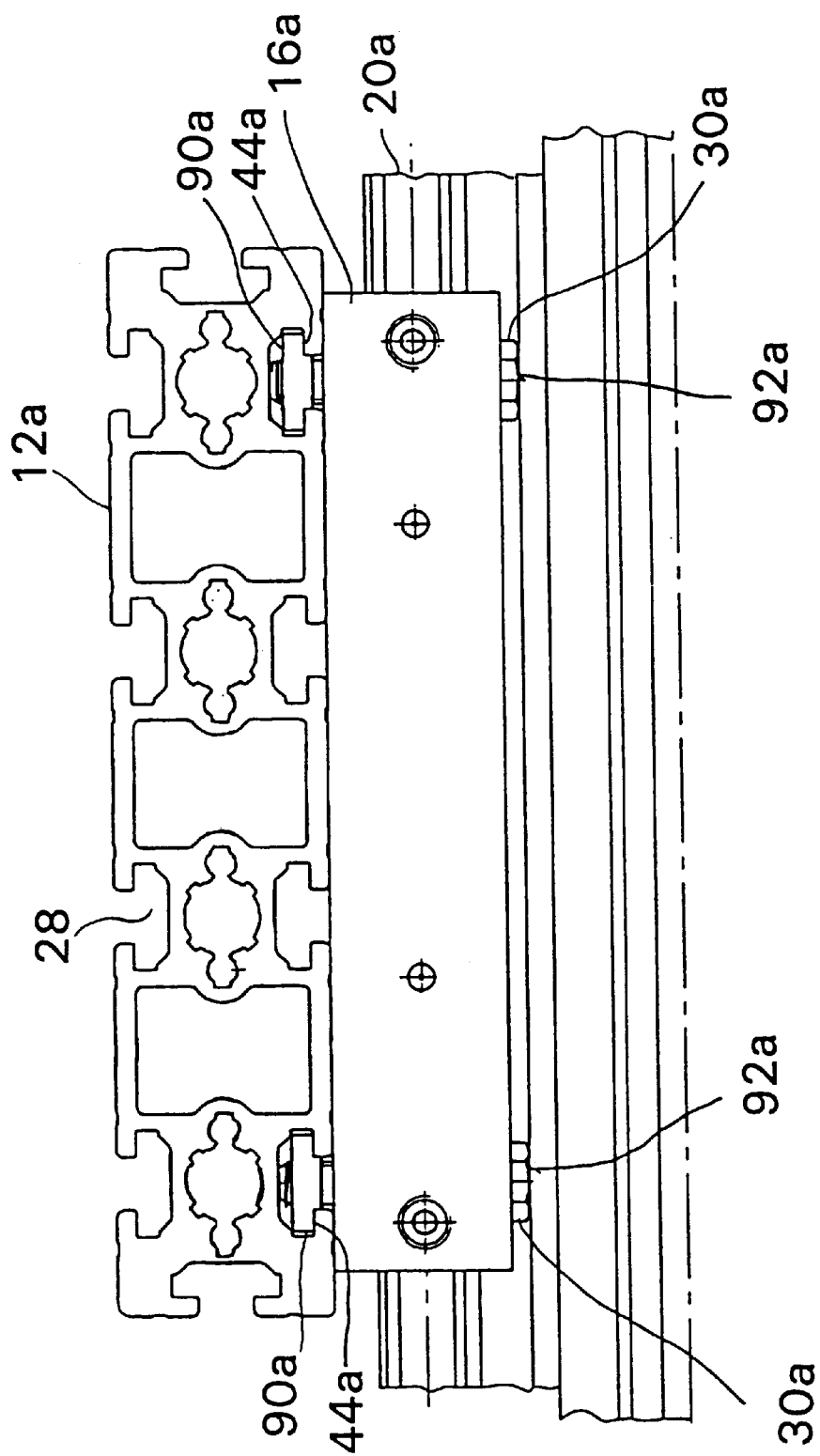
FIG. 5 is a view corresponding to FIG. 3 in a direction V in FIG. 4.

In FIGS. 4 and 5 an alternative embodiment is shown which with respect to its construction substantially corresponds to the one described with reference to FIGS. 2 and 3. Therefore the respective components are indicated by the same reference signs having the appendix "a". In the following only the differences with respect to the embodiment according to FIGS. 2 and 3 are described.

As can be seen in FIG. 4 a groove strip 90a is provided instead of the groove blocks 34, and the groove strip is associated to both guide member units 16a. The groove strip 90a again comprises internal threaded openings 36a for the fastening bolts 30a. In this embodiment the fastening bolts 30a are normal screw bolts having a head 92a.

For fixing the groove strip 90a within the respective guiding groove 28a the groove strip 90a comprises further internal threaded openings 94a, into which clamping screws 96a are screwed. For fastening the guide member units 16a to the basic body 12, the following measures are taken: First the or every groove strip 90a is brought into the desired position and the clamping screws 96a are tightened by means of a tool, such that they press against the groove bottom 40a. Thereby a displacement of the groove strip 90a within the guiding groove 28a is obtained, as already explained above, until the groove strip 90a abuts against the undercut face of the groove 28a and thereby is clamped within the groove 28a. Next the guide member units 16a, for example having the guiding raceway 20a disposed therebetween, are attached to the basic body 12 by means of the fastening bolts 30a, which are screwed into the internal threaded openings 36a. The fastening bolts 30a are screwed in only so far that an advancement of the guide member units 16a by means of the advancement devices 50a can still be carried out. The advancing procedure corresponds to the procedure as described with reference to FIG. 6. After the advancement has been carried out to the desired extent, the fastening bolts 30 are further tightened, such that the guide member units 16a are fixed to the basic body 12a. The fastening screws 30a are dimensioned such that upon completely fixing the guide member units 16a to the basic body 12 they do not abut against the groove bottom 40a, which possibly could prevent a sufficiently fixed clamping action for the guide member units 16a of the basic body 12a. Instead of that, even in a condition in which the fastening bolts 30a are completely tightened a sufficient clearance is provided between the ends 38a and the groove bottom 40a. Of course, such groove strips 90a can be provided for each of the fastening bolts provided for the respective guide member units 16a.

For enhancing the security against displacement of the fastening bolts 30 and 30a, respectively, in the embodiment shown in FIGS. 1–6 a profile can be provided on the undercut clamping faces 44 and 44a, respectively, of the groove blocks 34 and the groove strips 90a, respectively, for example in the shape of ribs extending perpendicular with respect to the positioning direction P and biting into the opposing undercut faces 46 on the basic body 12, if the fastening bolts 30 and the clamping screws 96a, respectively, abut against the groove bottom 40 and 40a, respectively, such that a displacement of the groove blocks 34 and the groove strips 90a in the positioning direction P can be substantially impeded.

Figure 7:
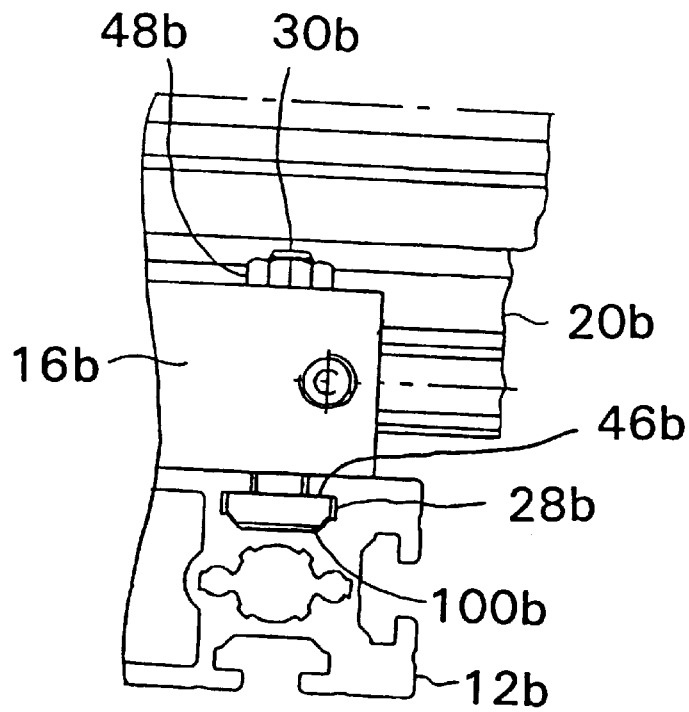
FIG. 7 is a part view of a further alternative embodiment for fixing a guide member unit to a basic body.
Figure 8:
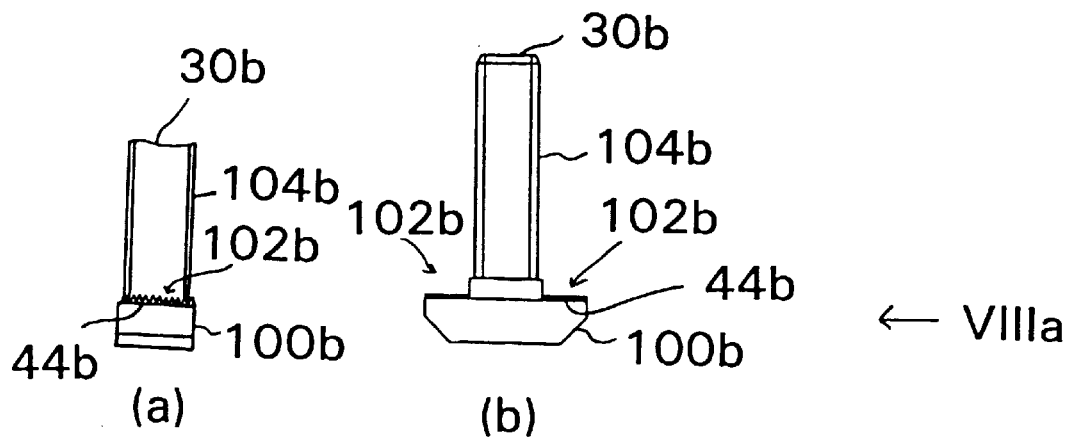

A variation of the embodiment according to FIGS. 2 and 3 is shown in FIGS. 7, 8a and 8b. Screws 30b having a head 100b and a threaded shaft 104b are used instead of the groove blocks 34b, and the head 100b is introduced into the grooves 28b. The introduction can be carried out from the open end of the respective groove 28b, or the head 100b of the screw can be pushed through the groove opening extending transversely to the positioning direction at an intermediate portion of the groove 28b and can then be turned into a rotation locking position defined by the abutment of a locking portion of the head 100b of the screw against a wall of the groove, which position for example corresponds to the position shown in FIG. 7. The locking portion can be constituted by a portion of the screw head 100b radially projecting with respect to a longitudinal axis of the screw. The screws 30b can then be moved, i.e. displaced, to the desired position within the respective grooves 28b; thereupon the guide member units 16b are pushed with their passage openings over the screws 30b and are fixed by means of nuts 48b which are to be attached to the screws 30b.

In order to provide security against displacement of the screws 30b in the positioning direction P the undercut clamping faces 44b of the screws 30b are provided with profile ribs 102b, which upon the insertion of the hammer-shaped screw head 100b in the associated groove 28b extend transversely with respect to the longitudinal direction of the groove and therefore transversely with respect to the positioning direction P. For fixing the guide member unit 16b to the basic body 12b the following measures are taken: First the necessary screws, for example the hammerhead bolts or screws 30b shown in FIGS. 8a and 8b are introduced into the respective grooves 28b with their heads 100b and are coarsely moved to the desired position. Thereupon the guide member units are pushed with their passage openings over the screw shafts 104b, as discussed above, and the nuts 48b are screwed to the screws. In this condition the screws 30b, which until now have not been tightened, can still be moved with respect to the basic body 12b together with the guide member unit 16b held thereon. After the desired position has been reached the nuts 48b are further tightened such that the profile ribs 102b bite into the undercut faces 46b in the basic body 12b and therefore prevent the displacement of the screws 30b in the positioning direction due to the positive coupling of the screw heads 100b and the basic body 12b. However, the nuts 48b are only tightened so far, that— although there is generated a positive coupling between the screws 30b and the basic body 12b—an adjustability of the guide member unit by means of the respective advancement device in the respective direction of advancement is still possible. I.e., the frictional force acting between the guide member units 16b and the basic body 12b during a displacement in the direction of advancement has to be lower than the frictional coupling or the positive coupling acting between the screw heads 100b and the basic body 12b. After the advancement has been carried out the nut or all the nuts 48b can be further tightened in order to finally fix the guide member unit 16b to the basic body 12b. Even with this embodiment an arbitrary positioning of the guide member unit 16 along the respective groove 28b can be obtained and the possibility of advancing and of using the fastening bolts as a support can be maintained.

Various modifications can be carried out to the above embodiments. For example it is possible that the grooves 28a do not have the shown T-shaped profile but have a dove-tailed profile, in which case the groove blocks and the grooves strips, respectively, have a complementary dove-tailed profile. Further a dowel-like fixation of the fastening bolts in the grooves is possible.

By means of the traveller assembly according to the present invention the construction of a working machine working in two or more coordinate directions can be carried out in an easy manner. In particular a high freedom for the design of a moving system can be obtained due to the displaceability of the guide member units on the respective basic bodies. Since the fastening bolts according to the present invention are secured within the guide grooves against displacement it is not necessary for the grooves to be defined such that they extend perpendicular with respect to the direction of advancement V on each side of the basic body 12, in order to prevent an undesired displacement of the fastening bolts when advancing the guide member units. Instead in all sides of the basic body 12 guide grooves 28 extending parallel to each other can be provided. This allows the easy and inexpensive manufacturing of the basic body 12 from plastics material or aluminum or the like in an extrusion process by means of a correspondingly shaped extrusion head. Therefore, additional working steps for generating the undercut grooves in the basic body are not necessary.

What is claimed is:

1. A traveller assembly for a linear guiding device, the traveller assembly being supported on a raceway of a guide rail assembly for movement along a guide axis and comprising, a basic body, and at least one guide member unit attached to and supporting the basic body on the raceway, the at least one guide member unit having at least one guiding member and being supported with respect to the basic body by a support member, the guide member unit being adjustable relative to the basic body and the support member towards and away from the raceway along a plane of advancement substantially parallel to the guide axis and in a direction of advancement substantially perpendicular to the guide axis, the support member extending substantially perpendicularly to the plane of advancement, crossing the guide member unit such as to permit adjustment of the guide member unit relative to the support member along the plane of advancement, and being affixed to the basic body in a selected position that is variable relative to the basic body transversely with respect to the length of the support member and parallel to the plane of advancement, the basic body including a positioning track and the support member being attached to a positioning track engagement element that is received in the positioning track, the positioning track engagement element being affixable at a plurality of positioning locations along the positioning track, and said at least one guide member unit having an adjustment element adjustably coupled to the guide member unit for movement relative to the guide member unit and engaging the support member such as to move of the guide member unit relative to the support member along the plane of advancement and in the direction of advancement and thereby adjust the clearance between the guiding member and the raceway.

2. The traveller assembly according to claim 1, wherein the positioning track engagement element is continuously adjustable along the positioning track and is affixable at an infinite number of positions along the positioning track.

3. The traveller assembly according to claim 2, wherein the positioning track is provided by an undercut positioning groove in an abutment face of the basic body, and the guide member unit lies against the abutment face with a counter abutment face thereof engaging the abutment face.

4. The traveller assembly according to claim 3, wherein the undercut positioning groove is a T-groove or a dove-tailed groove.

5. The traveller assembly according to claim 1, wherein the positioning track engagement element is affixable in the positioning track by clamping.

6. The traveller assembly according to claim 5, wherein the positioning track is an undercut positioning groove, the positioning track engagement element is received within the undercut positioning groove, and the clamping means includes at least one bottom clamping member and at least one undercut clamping face, the undercut clamping face engaging an undercut face of the undercut positioning groove from the rear, the bottom clamping member being adjustable with respect to the positioning track engagement element and engaging the bottom of the undercut positioning groove.

7. The traveller assembly according to claim 6, wherein the at least one bottom clamping member is adjustable within the positioning track engagement element by threads.

8. The traveller assembly according to claim 7, wherein at least one bottom clamping member is provided by an end portion of a support member.

9. The traveller assembly according to claim 8, wherein the support member has at an end portion thereof remote from the positioning track a turning tool engagement face for advancing an end portion thereof proximate to the positioning groove into engagement with the bottom of the undercut positioning groove and has a tightening member engagement means for the engagement of a tightening member that presses the guide member unit against the basic body.

10. The traveller assembly according to claim 9, wherein the tightening member engagement means is an external thread of the support member, and the tightening member is a tightening nut.

11. The traveller assembly according to claim 7, wherein the positioning track engagement element has at least one threaded hole for receiving a bottom clamping member separate from the support member and at least one further threaded hole for receiving an external thread of the support member, a tightening face being provided on the support member in a portion thereof remote from the positioning track for clamping the guide member unit against the basic body.

12. The traveller assembly according to claim 1, wherein the support member is affixable to the basic body by tightening the guide member unit against the basic body by means of the support member by introducing a tightening force into the support member, which force on the one hand is sufficient for the fixation and on the other hand allows the adjustment of the guide member unit in the direction of advancement.

13. The traveller assembly according to claim 12, wherein the frictional conditions between the support member and the basic body on the one hand and the frictional conditions between the guide member unit and the basic body on the other hand are different such that upon introducing a predetermined tension into the support member the support member is fixed with respect to the basic body and the guide member unit is still adjustable in the direction of advancement.

14. The traveller assembly according to claim 13, wherein a frictional force enhancing profile means is provided between the support member on the one hand and the basic body on the other hand.

15. The traveller assembly according to claim 1, wherein the positioning track engagement element is arranged for the affixation of a respective one of a pair of guide member units opposing each other transversely with respect to the guide axis, the guide member units being associated with respective raceways of the guide rail.

16. The traveller assembly according to claim 1, wherein a plurality of parallel positioning tracks are provided side by side on at least one abutment face of the basic body.

17. The traveller assembly according to claim 16, wherein at least one respective positioning track is provided at each of at least two abutment faces of the basic body, the positioning tracks extending substantially parallel to each other.

18. The traveller assembly according to claim 17, wherein the basic body is an extrusion profile in which each positioning track is formed as an undercut positioning groove during an extrusion procedure.

19. The traveller assembly according to claim 1, wherein there are at least two groups of guide member units attached to the basic body, each of the groups being arranged for cooperation with a different guide rail assembly.

20. The traveller assembly according to claim 19, wherein the groups of guide member units are arranged for cooperation with guide rail assemblies that cross each other.

21. The traveller assembly according to claim 1, wherein the adjusting element is adjustably coupled to the guide member unit by means of a threaded engagement between the adjusting element and the guide member unit.

* * * * *

UNITED STATES PATENT AND TRADEMARK OFFICE
CERTIFICATE OF CORRECTION

PATENT NO. : 6,158,891
DATED : December 12, 2000
INVENTOR(S) : Faulhaber et al.

Page 1 of 1

It is certified that error appears in the above-identified patent and that said Letters Patent is hereby corrected as shown below:

Column 3,
Line 40, "Preferrably," should read -- Preferably, --

Column 5,
Line 7, "respectives" should read -- respective --

Column 7,
Line 40, "or every" should be deleted.

Column 9,
Line 27, "perpendicular" should read -- perpendicularly --

Column 10,
Line 6, "to move of the" should read -- to move the --
Line 25, "clamping." should read -- clamping means. --

Signed and Sealed this

First Day of January, 2002

Attest:

JAMES E. ROGAN
*Attesting Officer*   *Director of the United States Patent and Trademark Office*